United States Patent [19]

Legler

[11] 3,793,479

[45] Feb. 19, 1974

[54] ARRANGEMENT FOR ADDITIVELY MIXING COLOR TELEVISION SIGNALS

[75] Inventor: Ernst Legler, Seeheim, Germany

[73] Assignee: Robert Bosch Fernsehanlagen Gesellschaft mit beschrankter Haftung, Darmstadt, Germany

[22] Filed: June 13, 1972

[21] Appl. No.: 262,324

Related U.S. Application Data

[63] Continuation of Ser. No. 37,269, May 14, 1970, abandoned.

[30] Foreign Application Priority Data

May 16, 1969 Germany ............................ 1924912

[52] U.S. Cl. .......................... 178/5.4 R, 178/DIG. 6

[51] Int. Cl. .......................... H04n 9/00, H04n 5/22

[58] Field of Search.. 178/5.2 R, 5.4 R, 5.4 SY, 6.8, 178/7.1, DIG. 6; 328/104, 158; 330/84

[56] References Cited

UNITED STATES PATENTS 3,272,919 9/1966 Thompson ..................... 178/DIG. 6

*Primary Examiner*—Howard W. Britton
*Assistant Examiner*—George G. Stellar
*Attorney, Agent, or Firm*—Michael S. Striker

[57] ABSTRACT

A first and second input composite television signal have, respectively, a first and second video portion and first and second blanking intervals including synchronizing signals. First circuit means furnish a plurality of first signals, each corresponding to the sum of one of said first synchronizing signals added to one of said second synchronizing signals. Second circuit means vary the level of the first and second video portions and furnish a second signal corresponding to the sum of the first and second video portions having the varied levels. A first automatic gain control amplifier is connected to the output of the first circuit means, while a second automatic gain control amplifier is connected to the output of the second circuit means. First adder means have inputs connected to the outputs of said first and second automatic gain control amplifier means and furnish an output composite television signal having synchronizing signals corresponding to the amplitude controlled first signals and a video portion corresponding to the amplitude controlled second signals.

18 Claims, 3 Drawing Figures

Inventor:
Ernst Legler
by Nelson S. Stoker
Attorney

ARRANGEMENT FOR ADDITIVELY MIXING COLOR TELEVISION SIGNALS

CROSS REFERENCE TO RELATED APPLICATIONS:

This application is a continuation of my application Ser. No. 37,269, filed May 14, 1970 now abandoned.

BACKGROUND OF THE INVENTION:

The present invention resides in an arrangement for mixing additively television signals and, in particular, color television signals. The arrangement is primarily adapted to blend video signals from different picture signal sources, or for superimposing components upon video signals.

In television studio operation, a mixing regulator is provided for each of the blended or mixed television signals. Each of the television signals applied to the arrangement, is at a uniform level, corresponding preferably to the standard level which can be varied between zero and a maximum value. The television signals are added subsequently, at a preselected adjusted level. The level of the resulting summation signal can, thereby, fluctuate within wide limits, and can also be substantially greater than the uniform nominal level. A requirement for the mixing arrangement, however, is that the output level shall not exceed the normal maximum value, independent of the position of the adjustable elements in the individual television signals.

In order to satisfy this requirement for the mixing arrangement, a control amplifier is provided for the combined signal, in conventional apparatus. The control amplifier prevents the increase of the level above the nominal white value. In a conventional mixing arrangement, the synchronizing component is suppressed in the combined signal regulated to the constant white value, in order to maintain constant the level of the synchronizing signal within the output of the mixing arrangement. A new synchronizing signal of constant amplitude is then added. The new synchronizing signal is taken from the central pulse generator which also synchronizes the picture signal generators. The latter generate the television signals which are to be mixed together.

A composite television signal, either black-and-white or color, corrected to the standard, appears at the output of the mixing arrangement. The signal mixture has a picture signal component with a level that does not rise above the nominal white value. The synchronizing signal of the picture signal mixture has the constant amplitude required by the standard.

It has been found that mixing arrangements of the conventional design, operate satisfactorily in the blending of black and white signals. However, they cannot be used with the required reliability, in the mixing of color television signals. In conventional color television signals, synchronizing information is transmitted as a color synchronizing signal in the form of a train of oscillations with the color carrier frequency in the blanking intervals of the color television signals. Such synchronizing information is in addition to the synchronizing signal with horizontal and vertical frequency synchronizing pulses.

The entire synchronizing information, including the color synchronizing signals of the color television signals to be mixed together, may be replaced by external synchronizing information consisting of corresponding synchronizing signals and color synchronizing signals. In that event, however, the danger prevails that undesirable small differences of transit time of the input signals to the mixing arrangement, impair the phase relationship between the color synchronizing signal and the color carrier in the chrominance signal. Impairing the phase relationship, in this manner, gives rise to errors in color reproduction. The effect of the differences of that transit time of the input signals can be neglected with respect to the synchronizing signal. Therefore, to enable the mixing arrangement to be adapted without limitation to color television signals, the individual color synchronizing signals must be retained in the color television signals which are to be mixed. Consequently, when executing the blending in and blending out operations, the color synchronizing signal is also transmitted with each color television signal. When mixing two color television signals, an average value is generated for the color synchronizing signals which constitute a mixture. It is also essential to meet the standard requirements for mixing arrangements adapted to television signals, with respect to constant amplitude of the synchronizing signal and the color synchronizing signal in the output signal, independent of the preceding requirements. It is also necessary to maintain the amplitude range for the picture signal without exceeding the nominal white value.

Mixing arrangements which meet the requirements described above for color television signals, are already known in the art. In these conventional arrangements, a constant output level is maintained by controlling the load resistance for the sum current, as a function of the positions of the control elements for the signal level. The design is such that the load resistance is inversely proportional to the sum of the positions of the control elements. As a result, the level of the picture signals at the output of the arrangement cannot be greater, in any event, than the white value. The amplitudes of the synchronizing signals, moreover, and the color synchronizing signals, remain constant. A disadvantage, however, prevails with respect to the permissible maximum value of the output signals. This maximum value is not always attained because the positions of the control elements determine the level control, instead of the sum signal itself.

SUMMARY OF THE INVENTION

It is the object of the present invention to provide a mixing arrangement for color television signals which meet the requirements for the mixing of color television signals and is, at the same time, free from the disadvantage described above in conjunction with the conventional arrangements.

The present invention therefore comprises an arrangement for additively mixing a first and second input composite television signal, having, respectively, a first and second video portion and first and second blanking intervals including first and second synchronizing signals. It comprises first circuit means furnishing a plurality of first signals, each corresponding to the sum of one of said first synchronizing signals added to one of said second synchronizing signals. Second circuit means are provided for varying the level of said first and second video portions and furnishing a second signal corresponding to the sum of said first and second video portions having so varied levels. First automatic gain control amplifier means are connected to the output of the first circuit means for furnishing amplitude controlled first signals in response to said first signals. Second automatic gain control amplifier means are connected to the output of said second circuit means for furnishing amplitude controlled second signals in response to said second signals. Finally, first adder means are connected to the outputs of said first and second automatic gain control amplifier means, for furnishing an output composite television signal having synchronizing signals corresponding to said amplitude controlled first signals and a video portion corresponding to said amplitude controlled second signals.

The automatic control gain amplifiers preferably have an adjustable response threshold, so that control is exercised only when the input signals thereto attain a predetermined level.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
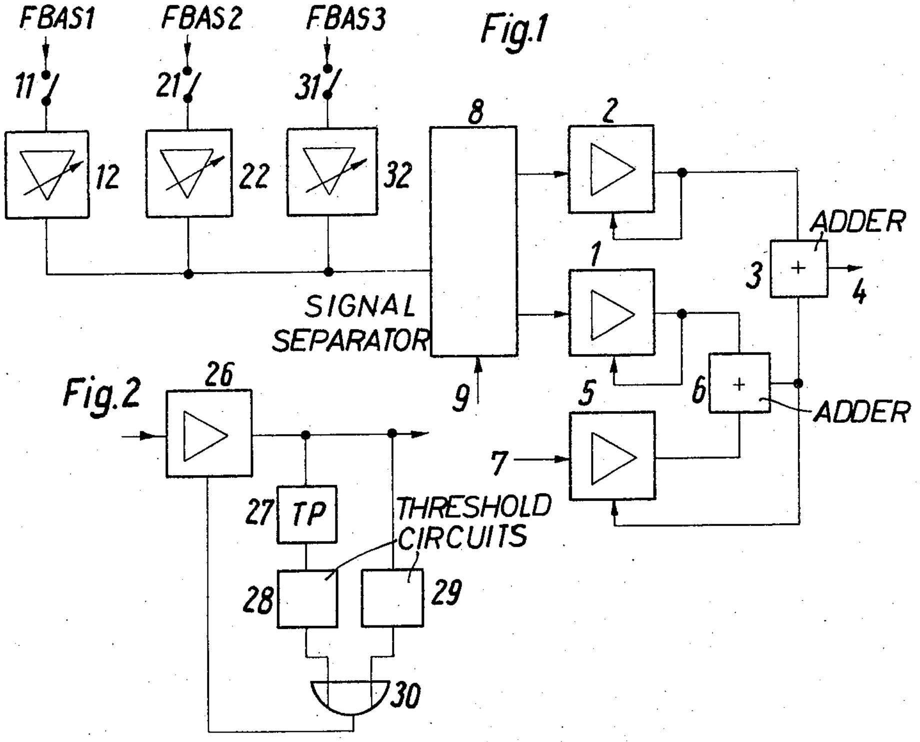
FIG. 1 is a functional block diagram of a first embodiment of the mixing arrangement in accordance with the present invention.
FIG. 2 shows the video signal automatic gain control amplifier used in the arrangement of FIG. 1.

Referring to the drawing, and in particular to FIG. 1, reference numeral 1 refers to first automatic gain control amplifier means used in the arrangement for mixing and blending the desired number of television signals of which examples are designated in the drawing by FBAS 1, FBAS 2 and FBAS 3 where the designation FBAS stands for composite color television signals. The synchronizing information, namely horizontal and vertical synchronizing signals and the color synchronizing signal, is applied to the input of amplifier 1. The synchronizing signal is derived from the incoming composite color television signals as described below. Amplifier 1 has a response threshold adjusted in nominal value to the synchronizing signal and the color synchronizing signal, so that the control function takes place only when the output level of amplifier 1 reaches the nominal value. In this manner, the output level is maintained substantially constant at this nominal value, and independent of the magnitude of the input signal level.

A second automatic gain control amplifier 2 receives the picture or video information of the color television signal outside of the blanking intervals. The amplifiers 1 and 2 are shown in schematic form in the drawing. Amplifier 2 also has a response threshold which is adjusted preferably to the standard white level of the television signal, so that the exceeding of this standard level is prevented.

In accordance with another embodiment of the present invention, amplifier 2 can be advantageously designed so that it also possesses a preferably adjustable response threshold for the luminance signal, in addition to possessing a response threshold for the total picture information of a color television signal. In this manner, the control effect is exercised by the larger control voltage existing at any given time.

FIG. 2 shows a practical example of this embodiment in schematic form. First, the output signal from the control amplifier 26 is applied to a device 29 for producing a control voltage with an adjustable threshold value. Secondly, the luminance signal of a color television signal is separated from the output signal by means of a low-pass filter 27, and the output from this filter is applied to a device 28 for producing a separate control voltage adjustable in threshold value. These two control voltages are then applied to an OR circuit 30 which provides that the greater control voltage prevailing at any instant, is used to control the gain of amplifier 26.

In operating the mixing arrangement, it is possible that the variable level of one or more of the television signals, which are to be mixed together, has a small value to the extent that the level of the synchronizing signal does not reach the response threshold of the first automatic gain control amplifier. In that event, the synchronizing signals at the output of the first amplifier fall below the nominal value -a condition which is to be avoided. In order to provide that the synchronizing signals will, in any case, attain their nominal values, the synchronizing signal derived from the amplifier 1 is supplemented or superimposed by a separate external synchronizing signal, up to the full nominal value. An additional automatic gain control amplifier 5 (third automatic gain control amplifier means) may be provided for this purpose, as disclosed in FIG. 1. The amplifier 5 has applied to it external synchronizing information and vertical synchronizing pulses, as well as the color synchronizing signal. For as long as the synchronizing information at the output of the control amplifier 1 maintains the nominal value, amplifier 5 is blocked. Thus, this amplifier is controlled only in the increasing direction upon dropping of the level of the synchronizing information at the output of the amplifier 1. Such control acts so that the sum of the synchronizing signals provided by amplifiers 1 and 5 attains the nominal value. The output signals of amplifiers 1 and 5 are added together in the summing circuit 6, for this purpose, and the sum voltage from the circuit 6 is applied to amplifier 5 to serve as automatic gain control voltage. This control voltage influences amplifier 5 so that the output of the summing or adding stage 6 always has the nominal value for the synchronizing information, independent of the magnitude of the output voltage from the amplifier 1. The outputs of amplifier 2 and adding stage 6 are combined in a further adding stage 3 (first adder means). The components of the color television signal within and outside of the blanking intervals are brought to the nominal level through the control amplifiers 1, 5 and 2. These components are then combined in adding stage 3 to form an output composite television signal, and this signal is then available at output terminal 4.

Within unit 8, the black-and-white composite television signal mixture BAS or the color television signal mixture FBAS are split into the synchronizing information inside of the blanking intervals and the video information outside of the blanking intervals. The unit 8 is comprised, for this purpose, of two amplifiers having the television signal mixture applied to their inputs. One amplifier provides an output signal only during the blanking intervals, by use of a blanking signal applied to unit 8 at the point or terminal 9. The other amplifier is, at the same time, blocked from providing an output during the blanking periods, but is providing a signal at other times. This condition may be achieved, for example, by applying a pulse of opposite polarity to the blanking signal.

Connected to the input of the unit 8, are the outputs of amplifiers 12, 22 and 32 (level varying means) capable of having their amplification varied between zero and a maximum value. These amplifiers are used for varying the level of the television signals to be mixed together, and the variation in the amplification is preferably achieved through remote control means. For purposes of maintaining clarity, only three such amplifiers are shown in the drawing, and these are used for the reciprocal mixing and blending of three color television signals FBAS 1, FBAS 2, and FBAS 3. This arrangement, however, is adaptable to any desired number of input signals.

Switches 11, 21 and 31 may be advantageously inserted in the inputs to the amplifiers 12, 22 and 32, respectively. These switches are closed only when synchronism prevails with respect to the signals applied to the arrangement. These switches are opened, on the other hand, when the signals are non-synchronous.

Figure 3:
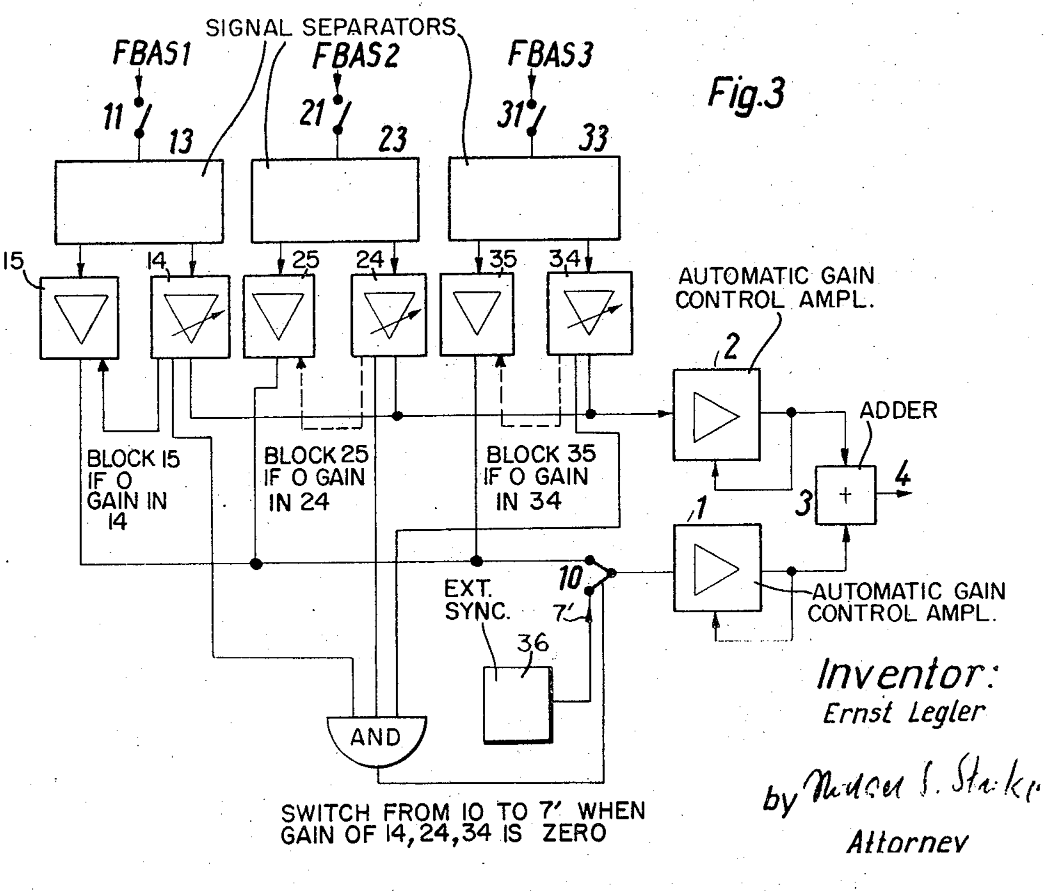
FIG. 3 is another embodiment of the arrangement of FIG. 1, shown in schematic block form.

Instead of splitting the picture signal mixture after forming the summation signal of the variable level television signals applied to the arrangement, it is possible to perform the splitting of each incoming television signal separately prior to the change of level. This situation is illustrated in FIG. 3. In accordance with this embodiment, a device for splitting the picture signal mixture into components within and outside the blanking intervals, is provided for each of the television signals to be mixed together. FIG. 3 also shows an arrangement for only three television signals for the purposes of clarity. The components containing the video portion (outside of the blanking intervals) of each of the signals to be mixed, passes through a respective amplifier 14, 24 and 34. Through means of these amplifiers, the level of the video signal portion is made variable between zero and a predetermined maximum value. The outputs of the amplifiers 14, 24 and 34 are joined together and applied through a common junction to the input of the second automatic gain control amplifier 2. The components of each of the television signals to be mixed which contain the synchronizing information pass through further respective amplifiers 15, 25 and 35 (constant gain amplifier means) which have a constant amplification factor. The constant amplification factor of the last-mentioned amplifiers preferably has a value equal to the maximum amplification factor of amplifiers 14, 24 and 34. The outputs of the amplifiers 15, 25 and 35 are similarly joined together to a common junction which is applied to the input of amplifier 1.

When at least one television signal is applied to the arrangement, amplifier 1 receives the synchronizing signals which are combined in the adding or summing stage 3 with the video signal portions from amplifier 2, so as to form a composite television signal. The synchronizing signals have the nominal value, and the arrangement is similar to that shown in FIG. 1. At output 4 of adding stage 3, the output composite television signal is made available. The path of the synchronizing information for the television signals supplied to the arrangement for the amplifiers 15, 25 and 35, is appropriately blocked when the particular adjusting element for the amplifiers 14, 24 and 34 is in zero position. As a result, the output signal has only the synchronizing information of those television signals, which actually take part in the mixing. It is furthermore advantageous to provide a transfer or switching device 10 through which a separate synchronizing information signal is applied to amplifier 1. Such a separate synchronizing information signal may, for example, be applied by a source of external synchronizing signals 36 to terminal 7', when all the adjusting elements of the devices for level variation (14, 24, 34) are at their zero positions.

It will be understood that each of the elements described above, or two or more together, may also find a useful application in other types of constructions differing from the types described above.

While the invention has been illustrated and described as embodied in mixing of television signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

1. Arrangement for additively mixing a first and second input composite television signal, having respectively a first and second video portion and first and second blanking intervals including first and second synchronizing signals, comprising, in combination, first circuit means for furnishing a first signal, corresponding to the sum one of said first synchronizing signals added to one of said second synchronizing signals; second circuit means for varying the level of said first and second video portions and furnishing a second signal corresponding to the sum of said first and second video portions having so-varied levels; first automatic gain control amplifier means connected to the output of said first circuit means for furnishing an amplitude controlled first signal in response to said first signal; second automatic gain control amplifier means connected to the output of said second circuit means for furnishing an amplitude controlled second signal in response to said second signal; and first adder means connected to the outputs of said first and second automatic gain control amplifier means, for furnishing an output composite television signal having synchronizing signals corresponding to said amplitude controlled first signal and a video portion corresponding to said amplitude controlled second signal.

2. An arrangement as set forth in claim 1, wherein said second circuit means comprise level varying means for varying the level of each of said first and second video portions from zero to a predetermined maximum video level.

3. An arrangement as set forth in claim 2, wherein said level varying means comprise first and second level varying means, for respectively varying the level of said first and second input composite television signals.

4. An arrangement as set forth in claim 3, wherein said first and second automatic gain control amplifier means have, respectively, a first and second gain control circuit, said first and second gain control circuits having, respectively, a first and second response threshold.

5. An arrangement as set forth in claim 4, wherein said second automatic gain control amplifier means has an output and a gain control input; and wherein said second gain control circuit means comprise video threshold means having an input connected to said output and a threshold output connected to said gain control input.

6. An arrangement as set forth in claim 5, wherein said second gain control circuit means further comprise low pass filter means connected to said output of said second automatic gain control amplifier means, and luminance threshold means having an input connected to the output of said low pass filter means and an output connected to said gain control input.

7. An arrangement as set forth in claim 6, further comprising OR-gate means interconnected between the outputs of said video and luminance threshold means and said gain control input, whereby the threshold means having the largest output controls the gain of said second automatic gain control amplifier means.

8. An arrangement as set forth in claim 1, wherein said second circuit means comprise level varying means for varying the level of said first and second input composite television signals, means furnishing a third signal corresponding to the sum of said input composite television signals having said so-varied levels, and video signal separator means for separating said video portions from said third signal, thereby creating said second signal.

9. An arrangement as set forth in claim 8, wherein said third signal has blanking intervals; and wherein said first circuit means comprise blanking interval separator means for separating signals occurring during said blanking intervals from said third signal, thereby creating said first signal.

10. An arrangement as set forth in claim 9, further comprising a source of external synchronizing signals; second adder means connected to said first automatic gain control amplifier means and said source of external synchronizing signals for furnishing a second adder output signal corresponding to the sum of said amplitude controlled first signals and said external synchronizing signals to said first adder means; and means interconnecting the output of said second adder means to said source of external synchronizing signals in such a manner that said source of external synchronizing signals is disabled when said second adder output signal has an amplitude exceeding a predetermined amplitude.

11. An arrangement as set forth in claim 10, wherein said source of external synchronizing signals comprises means furnishing said external synchronizing signals, and third automatic gain control amplifier means having a signal input connected to said means, an output connected to the input of said second adder means, and a gain control input connected to the output of said second adder means.

12. An arrangement as set forth in claim 1, wherein said second circuit means comprise a first and second video signal separator means for, respectively, separating said first and second video portion from said first and second input composite television signals; and a first and second level changing means, respectively connected to the output of said first and second video signal separator means for individually varying the level of said so-separated video portions.

13. An arrangement as set forth in claim 1, wherein said first circuit means comprise a first and second blanking interval separator means for, respectively separating said blanking intervals from said first and second input composite television signals; and first and second constant gain amplifier means, respectively connected to the output of one of said blanking interval separator means.

14. An arrangement as set forth in claim 13, wherein said first and second level changing means comprise respectively, a first and second level changing amplifier, each having gain adjustment means for adjusting the gain thereof between zero and a predetermined maximum gain.

15. An arrangement as set forth in claim 14, wherein each of said constant gain amplifier means has a gain equal to said predetermined maximum gain.

16. An arrangement as set forth in claim 15, further comprising means blocking the corresponding one of said constant gain amplifiers when one of said level changing amplifiers has a zero gain.

17. An arrangement as set forth in claim 16, further comprising a source of external synchronizing signals; and means connecting said source of external synchronizing signals to the input of said first automatic gain control amplifier means when the gain of all of sald level changing amplifiers is zero.

18. An arrangement as set forth in claim 1, wherein said first and second input composite television signal and said output composite television signal are color composite television signals.

* * * * *